United States Patent
Koyanagi et al.

(10) Patent No.: US 10,095,555 B2
(45) Date of Patent: Oct. 9, 2018

(54) TASK CONTROL SYSTEM

(71) Applicants: HONDA MOTOR CO., LTD., Tokyo (JP); SUMITOMO ELECTRIC SYSTEM SOLUTIONS CO., LTD., Tokyo (JP)

(72) Inventors: Junichi Koyanagi, Saitama (JP); Go Nakamoto, Tokyo (JP); Satoru Yokote, Osaka (JP); Isao Onishi, Osaka (JP); Kanehiro Imanishi, Osaka (JP); Takafumi Yamori, Osaka (JP)

(73) Assignees: HONDA MOTOR CO., LTD., Tokyo (JP); SUMITOMO ELECTRIC SYSTEM SOLUTIONS CO., LTD., Tokyo (JP)

( * ) Notice: Subject to any disclaimer, the term of this patent is extended or adjusted under 35 U.S.C. 154(b) by 103 days.

(21) Appl. No.: 15/223,126

(22) Filed: Jul. 29, 2016

(65) Prior Publication Data
US 2017/0031727 A1    Feb. 2, 2017

(30) Foreign Application Priority Data
Jul. 31, 2015   (JP) .................................. 2015-151987

(51) Int. Cl.
*G06F 9/46*   (2006.01)
*G06F 9/50*   (2006.01)

(52) U.S. Cl.
CPC .......... *G06F 9/5088* (2013.01); *G06F 9/5038* (2013.01)

(58) Field of Classification Search
CPC ................................................... G06F 9/4881
(Continued)

(56) References Cited

U.S. PATENT DOCUMENTS

| 8,706,798 B1* | 4/2014 | Suchter ................. G06F 9/5038 |
| | | 709/202 |
| 2008/0222640 A1* | 9/2008 | Daly ..................... G06F 9/4881 |
| | | 718/103 |

(Continued)

FOREIGN PATENT DOCUMENTS

| JP | 2001-195267 A | 7/2001 |
| JP | 2006-338264 A | 12/2006 |

(Continued)

OTHER PUBLICATIONS

Japanese Office Action dated Jun. 26, 2018, issued in corresponding Japanese patent application No. 2015-151987.

*Primary Examiner* — Mehran Kamran
(74) *Attorney, Agent, or Firm* — Squire Patton Boggs (US) LLP

(57) ABSTRACT

To provide a system capable of appropriately assigning, in consideration of a state concerning increase in an arithmetic processing load required for executing each of a plurality of tasks, each task to a plurality of arithmetic processing resources. An indication value is detected which represents a degree of an arithmetic processing load required for executing each of the plurality of tasks. Whether or not the indication value satisfies a predetermined condition is determined. States or occurring events in an area concerning execution of the plurality of tasks are detected. Each of the plurality of tasks is assigned to each of the plurality of servers S1 to Sn (arithmetic processing resources) in a different order of priority depending on a difference of the detected state on a requirement that the indication value satisfies the predetermined condition.

13 Claims, 6 Drawing Sheets

(58) Field of Classification Search
USPC .......................................................... 718/103
See application file for complete search history.

(56) References Cited

U.S. PATENT DOCUMENTS

| | | | | |
|---|---|---|---|---|
| 2008/0229318 A1* | 9/2008 | Franke | ................... | G06F 9/5038 |
| | | | | 718/104 |
| 2009/0300623 A1* | 12/2009 | Bansal | ................... | G06F 9/5066 |
| | | | | 718/102 |
| 2009/0327216 A1* | 12/2009 | Brown | ............... | G06F 17/30474 |
| 2010/0070128 A1* | 3/2010 | Johnson | ........... | G08G 1/096783 |
| | | | | 701/31.4 |
| 2010/0145929 A1* | 6/2010 | Burger | .............. | G06F 17/30469 |
| | | | | 707/713 |
| 2013/0074087 A1* | 3/2013 | Chambliss | ............. | G06F 9/4881 |
| | | | | 718/103 |
| 2014/0040474 A1* | 2/2014 | Blagodurov; Sergey | .................... | |
| | | | | G06F 9/5088 |
| | | | | 709/226 |
| 2014/0068623 A1* | 3/2014 | Kanemasa | ............ | G06F 9/4881 |
| | | | | 718/103 |
| 2014/0181834 A1* | 6/2014 | Lim | ...................... | G06F 9/5088 |
| | | | | 718/105 |
| 2014/0189708 A1* | 7/2014 | Lee | ......................... | G06F 9/505 |
| | | | | 718/104 |
| 2014/0380264 A1* | 12/2014 | Misra | ......................... | G06F 8/00 |
| | | | | 717/100 |
| 2015/0095789 A1* | 4/2015 | Hyde | .................. | B60L 11/1824 |
| | | | | 715/738 |
| 2015/0345967 A1* | 12/2015 | Meuleau | ............ | G01C 21/3453 |
| | | | | 701/25 |
| 2016/0004569 A1* | 1/2016 | Kim | ....................... | G06F 9/5027 |
| | | | | 718/104 |
| 2016/0069695 A1* | 3/2016 | Broadbent | ......... | G01C 21/3691 |
| | | | | 701/411 |
| 2016/0147575 A1* | 5/2016 | Singh | .................... | G06F 9/5088 |
| | | | | 718/105 |
| 2016/0335890 A1* | 11/2016 | Bernhardt | ............ | G08G 1/0967 |
| 2017/0147369 A1* | 5/2017 | Spracklen | ........... | G06F 9/45533 |
| 2017/0190358 A1* | 7/2017 | Kobayashi | ................ | B62D 6/10 |
| 2017/0192823 A1* | 7/2017 | Karaje | .................. | G06F 9/5038 |

FOREIGN PATENT DOCUMENTS

| | | |
|---|---|---|
| JP | 2014-206879 A | 10/2014 |
| JP | 2015-095125 A | 5/2015 |
| WO | WO 2014/016950 A1 | 1/2014 |

\* cited by examiner

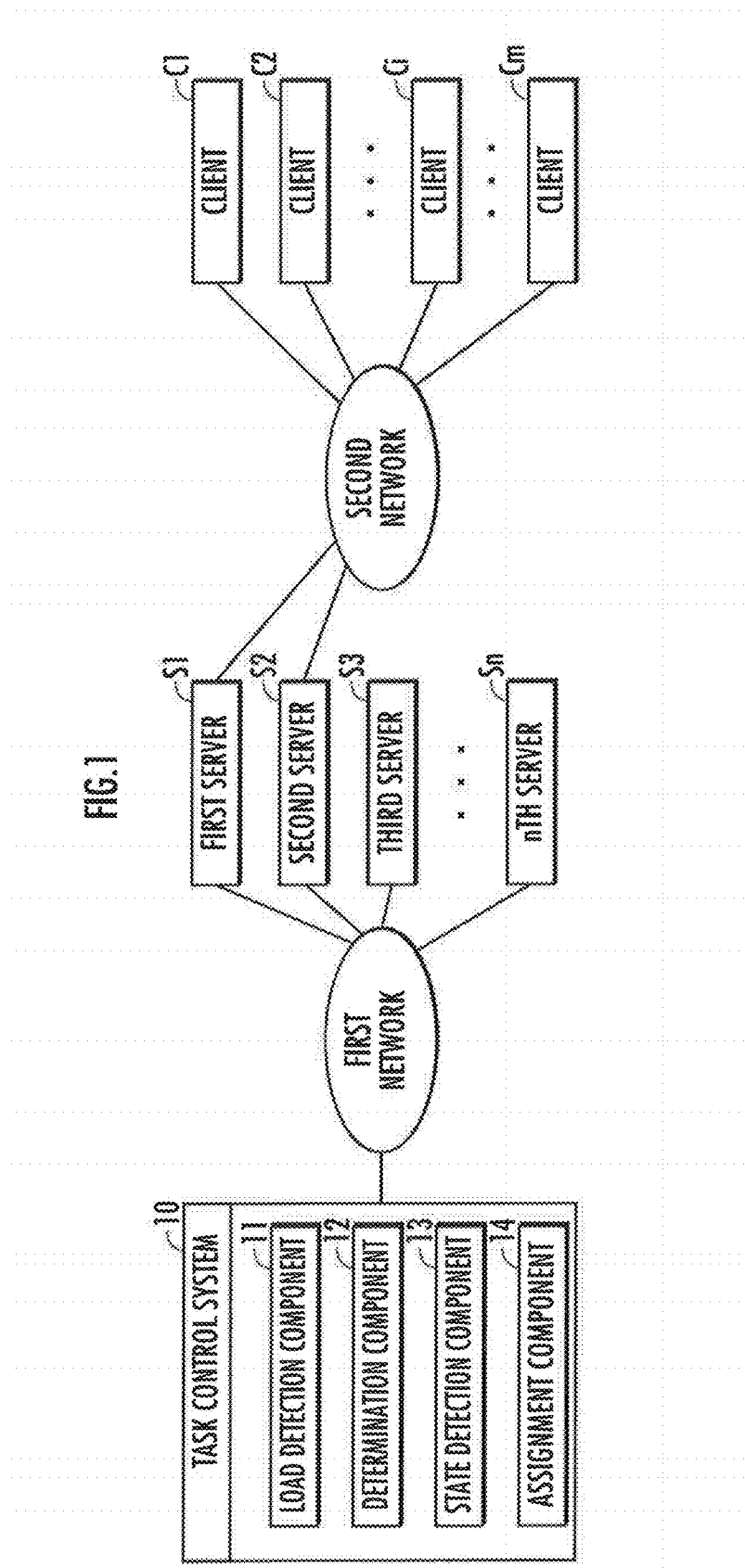

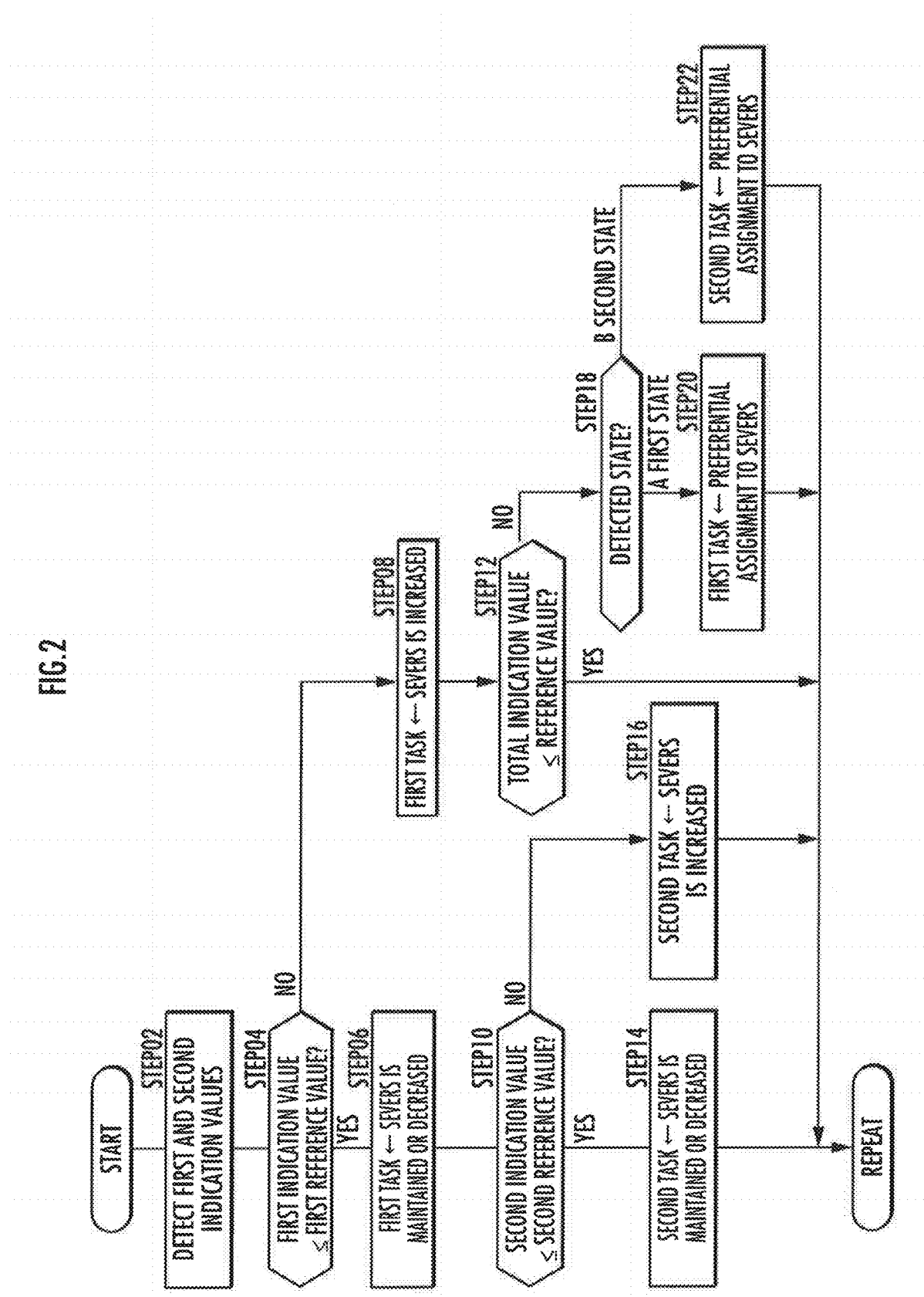

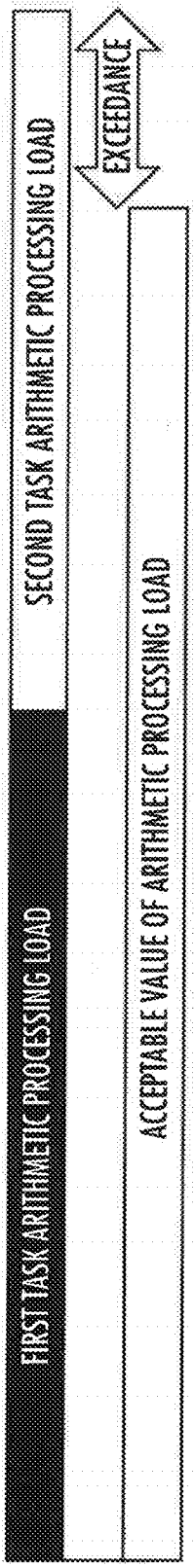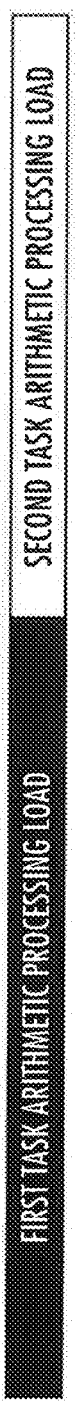

TASK CONTROL SYSTEM

BACKGROUND OF THE INVENTION

Field of the Invention

The present invention relates to a technology which assigns a plurality of tasks to each of a plurality of information arithmetic processing components constituting a distributed processing system, the components being connected to be communicable with each other via a communication network.

Description of the Related Art

There has been proposed a technical method for assigning a task such as a path search process to a proper arithmetic resource depending on a task processing capability for each of a plurality of arithmetic processing resources (see, Japanese Patent Laid-Open No. 2006-338264).

There has been proposed a technical method in which in execution of a plurality of processing loads which are arranged to be distributed with respect to a plurality of processing nodes, a prediction is made regarding a change of a communication load amount in conjunction with migration of the processing load between a selected pair of processing nodes on the basis of a communication traffic between the processing loads, and the plurality of processing loads are rearranged on the basis of a result of the prediction (see, International Publication No. WO2014/016950A1).

However, in a case where an arithmetic processing load required for executing each of the plural tasks increases in response to a certain state or an event occurrence, and accordingly a task as a part of the relevant plural tasks is executed prior to the rest of the tasks, there is a possibility that an order of the priority may become inappropriate in consideration of the relevant state.

For this reason, the object of the present invention is to provide a system capable of appropriately assigning, in consideration of a state concerning increase in an arithmetic processing load required for executing each of a plurality of tasks, each task to a plurality of arithmetic processing resources.

SUMMARY OF THE INVENTION

A task control system according to the present invention assigns a plurality of tasks to each of a plurality of arithmetic processing resources constituting a distributed processing system, the resources being connected to be communicable with each other via a communication network, the task control system comprising a load detection component configured to detect an indication value which represents a degree of an arithmetic processing load required for executing each of the plurality of tasks, a determination component configured to determine whether or not the indication value detected by the load detection component satisfies a predetermined condition, a state detection component configured to detect a state or an occurring event concerning execution of the plurality of tasks, and an assignment component configured to assign each of the plurality of tasks to each of the plurality of arithmetic processing resources in a different order of priority depending on a difference of the state detected by the state detection component on a requirement that the determination component determines that the indication value satisfies the predetermined condition.

According to the task control system in an aspect of the invention, the state detection component distinguishes and detects the plural states different in a level of an effect degree on an entity present in an area.

According to the task control system in an aspect of the invention, the assignment component assigns a specified task more preferentially than another task to a plurality of the arithmetic processing loads in a case where the state detection component detects one state which is relatively higher in the effect degree on the entity than another state.

According to the task control system in an aspect of the invention, the load detection component detects a first indication value representing a degree of an arithmetic processing load required for executing a first task as the specified task which includes deriving first information concerning the area depending on a request received from the entity or a first client thereof, and detects a second indication value representing a degree of an arithmetic processing load required for executing a second task as the another task which includes deriving second information concerning the area based on a basic information received from a second client.

According to the task control system in an aspect of the invention, on a requirement that the determination component determines that the indication value concerning one task of the plurality of tasks satisfies the predetermined condition of exceeding a first threshold, the assignment component increases the arithmetic processing resources to be assigned with the one task.

According to the task control system in an aspect of the invention, on a requirement that the determination component determines that the indication value concerning the one task satisfies the predetermined condition of being less than a second threshold after exceeding the first threshold, the assignment component decreases the arithmetic processing resources to be assigned with the one task.

According to the task control system in an aspect of the invention, the load detection component detects, as the indication value, CPU utilization or a time integral value of the CPU utilization, or a value of an increasing function of the CPU utilization or the time integral value.

According to the task control system in an aspect of the invention, the assignment component increases or decreases the arithmetic processing resources to be assigned with at least one or each of the plurality of tasks.

According to the task control system of the present invention, it is possible to appropriately assign, in consideration of a state or event concerning increase in an arithmetic processing load required for executing each of a plurality of tasks, each task to a plurality of arithmetic processing resources.

BRIEF DESCRIPTION OF THE DRAWINGS

FIG. 1 is a configuration illustration of a task control system as an embodiment of the invention;

FIG. 2 is an explanatory diagram regarding a function of a task control system as an embodiment of the invention;

FIG. 3A to FIG. 3D are conceptual diagrams, in which FIG. 3A shows a state where a required arithmetic processing load for first and second tasks exceeds an acceptable value; FIG. 3B shows a task assigning aspect in a case of a state where a detected state is a first state; FIG. 3C shows a task assigning aspect in a case of a state where a detected state is a second state; and FIG. 3D shows a task assigning aspect in a case of a state where a detected state is other state;

Figure 4:
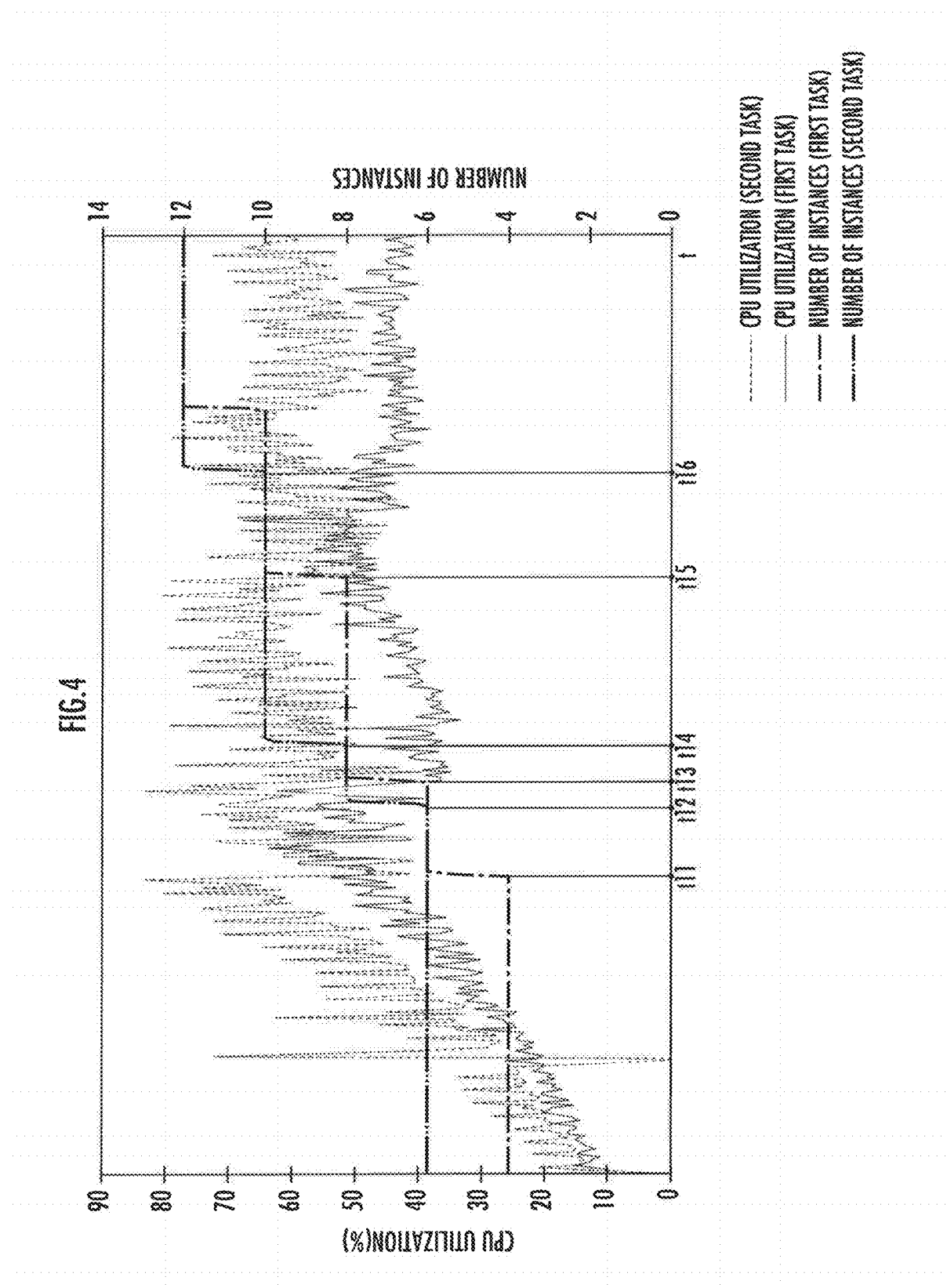
FIG. 4 is an explanatory diagram regarding a task assigning aspect in a case where the first state is detected.

DETAILED DESCRIPTION OF THE PREFERRED EMBODIMENTS (Configuration)

A task control system 10 shown in FIG. 1 is configured to assign a plurality of tasks to each of a plurality of servers S1 to Sn (e.g., n=8) which are connected to be communicable with each other via a first network. Each of a plurality of servers S1 to Sn constitutes an "arithmetic processing resource" of the present invention. A plurality of servers S1 to Sn constitute a system distributedly processing a plurality of tasks in conjunction with a communication with a plurality of clients Ci (i=1, 2, . . . , m) via a second network. At least a part of a plurality of servers S1 to Sn has a function to communicate with each client Ci. The first and second networks may be a common communication network. At least a part of a plurality of clients Ci may constitute the arithmetic processing resource.

The task control system 10 includes a computer (which is constituted by a CPU, a memory such as a ROM and a RAM, an I/O circuit and the like). The task control system 10 comprises a load detection component 11, a determination component 12, a state detection component 13, and an assignment component 14 which are configured to perform an arithmetic process described later.

A phrase that a constituent component of the invention is "configured" to perform a corresponding arithmetic process means that an arithmetic processing device constituting the relevant constituent component such as a CPU is "programed" or "designed" to read out necessary information and software from a memory such as a ROM and ROM or a storage medium and perform the arithmetic process on the information in accordance with the software. The respective constituent components may be constituted by a common processor (arithmetic processing device) or the respective constituent components may be constituted by a plurality of processors communicable with each other.

The client Ci includes an information terminal such as a tablet type terminal, a smartphone, or a wearable terminal (e.g., wristwatch terminal) whose size, shape and weight are designed so as to be portable by a user. The client Ci may be an information terminal whose size and the like are designed so as to be mountable on a vehicle. Each client Ci functions as each of a "first client" and a "second client".

A phrase that one device "recognizes" information on the basis of communication with another device means that any arithmetic process is performed for acquiring the information by means of the communication, including cases where one device receives the information from another device, one device derives the information by performing a predetermined arithmetic process (such as a calculation process, or a search process) on signals received from another device, one device receives from another device the information as a result from an arithmetic process by the relevant another device, and one device reads out the information from an internal storage device or an external storage device in accordance with the received signal.

(Function)

In an embodiment of the invention, basically, of a plurality of servers S1 to Sn, a first server S1 is configured to execute a "first task" and a second server S2 is configured to execute a "second task". Other servers S3 to Sn are configured to execute both or one of the first task and the second task, as necessarily. Anomalistically, the second task may be assigned to the first server S1, and inversely to this, the first task may be assigned to the second server S2.

The "first task" is a task which receives a request from the first client Ci1 (i1=1, 2, . . . , m), derives first information depending on the request, and transmits the first information to the relevant first client Ci1. The "request" includes information representing a latitude and longitude, or a latitude, longitude, and altitude indicating each of a starting place (or current place) and a destination place of a user of the first client Ci1. The "first information" includes information representing at least a part of server routes including a plurality of links connecting the starting place to the destination place. The first information may include information included in the request regarding a cost for moving from the starting place to the destination place (in addition to a required time, a required fuel efficiency, or a required electricity efficiency may be included). In deriving the first information, map data stored in a map database constituting the first server S1 as well as the first-class road traffic information supplied from a road traffic information center's server (not shown) and the second-class road traffic information supplied from the second server S2, are used. Various pieces of road traffic information include the information regarding the moving cost for each link constituting a road (having nodes such as an intersection as both end points), and further, for each traveling direction in the link (or for each lane corresponding to a link as a moving destination).

The "second task" is a task which receives basic information from the second client Ci2 (i2=1, 2, . . . , m), derives second information to be used in deriving the first information on the basis of the basic information, and transmits the second information to a server, of a plurality of servers S1 to Sn, assigned with the first task, or each client Ci. The "basic information" includes position information representing a latitude and longitude, or a latitude, longitude, and altitude indicating a position of the second client Ci2 as well as time information representing a presence time at the relevant position. The "second information" includes the second-class road traffic information at each link including the moving cost. For example, the basic information is probe information received from the second client Ci2 mounted in the vehicle. Moreover, for example, the second information is road traffic information derived from the probe information and used for searching a route connecting the departure place and the destination place. Moreover, for example, the second task is a task for receiving the probe information from the second client Ci2, deriving the (second-class) road traffic information used for route search from the probe information, and transmitting the road traffic information to the server assigned with the first task or each client Ci.

The load detection component 11 constantly or periodically detects a "first indication value" and a "second indication value"(FIG. 2/STEP02). The "first indication value" represents a degree of the arithmetic processing load required for executing the first task by at least a part of a plurality of servers S1 to Sn. The "second indication value" represents a degree of the arithmetic processing load required for executing the second task by at least a part of a plurality of servers S1 to Sn. There is detected, as each indication value, utilization of the CPU (arithmetic processing device) constituting the server assigned with the first task such as the first server S1, for example. There may be detected or calculated, as each indication value, a time integral value of the CPU utilization for a certain time period (e.g., one minute, five minutes), or the communication load amount between the relevant servers or with other device (such as the client Ci) (communication load amount between the processing nodes). A value of an increasing function of the CPU utilization or time integral value thereof may be detected as each indication value.

The determination component 12 determines whether or not the first indication value is equal to or less than a first reference value (FIG. 2/STEP04). For example, there is used as the first reference value a total of arithmetic processing capabilities (acceptable values such as the CPU utilization) of the server among the plurality of servers S1 to Sn, which is assigned with and executing the first task.

If the first indication value is determined to be equal to or less than the first reference value (FIG. 2/STEP04—YES), the number of servers assigned with the first task by the assignment component 14 is maintained or decreased (FIG. 2/STEP06). On the other hand, if the first indication value is determined to exceed the first reference value (FIG. 2/STEP04 . . . No), the number of servers assigned with the first task by the assignment component 14 is increased (FIG. 2/STEP08). The increased number is controlled depending on a degree of an exceedance of the first indication value with respect to the first reference value, and the number of servers assigned with the first task may be increased by one or may be increased by two or more. The first reference value corresponds to both a "first threshold" and a "second threshold" for the first indication value. The first threshold concerning an increase requirement for the server as an assignment target of the first task may not be the same, but may be different from the second threshold concerning a decrease requirement for the server as the assignment target of the first task.

After the number of the servers assigned with the first task is maintained or decreased (FIG. 2/STEP06), the determination component 12 determines whether or not the second indication value is equal to or less than a second reference value (FIG. 2/STEP10). For example, a total of arithmetic processing capabilities (acceptable values such as the CPU utilization) of the server among the plurality of servers S1 to Sn, which is assigned with executing the second task, may be used as the second reference value.

If the second indication value is determined to be equal to or less than the second reference value (FIG. 2/STEP10 . . . YES), the number of servers assigned with the second task by the assignment component 14 is maintained or decreased (FIG. 2/STEP14). On the other hand, if the second indication value is determined to exceed the second reference value (FIG. 2/STEP10 . . . No), the number of servers assigned with the second task by the assignment component 14 is increased (FIG. 2/STEP16). The increased number is controlled depending on a degree of an exceedance of the second indication value with respect to the second reference value, and the number of servers assigned with the second task may be increased by one or may be increased by two or more. After that, the process of detecting the first and second indication values (FIG. 2/STEP02) and the subsequent processes are repeated. The second reference value corresponds to both a "first threshold" and a "second threshold" for the second indication value. The first threshold concerning an increase requirement for the server as an assignment target of the second task may not be the same, but may be different from the second threshold concerning a decrease requirement for the server as the assignment target of the second task.

After the number of the servers assigned with the first task is increased (FIG. 2/STEP08), the determination component 12 determines whether or not a total indication value of the first and second indication values is equal to or less than a reference value (FIG. 2/STEP12). For example, a total of arithmetic processing capabilities (acceptable values such as the CPU utilization) of all of a plurality of servers S1 to Sn, is used as the reference value. For example, as conceptually shown in FIG. 3A, if the required arithmetic processing load for the first task (first indication value) and the required arithmetic processing load for the second task (second indication value) exceed the acceptable value (reference value), the relevant determination is negative. The total indication value exceeding the reference value corresponds to a "predetermined condition". An accumulated time period or continuous time period, in which the total indication value is exceeding the reference value, exceeding a predetermined time period, may be used as a predetermined condition.

If the total indication value is determined to be equal to or less than the reference value (FIG. 2/STEP12 . . . YES), the process of detecting the first and second indication values (FIG. 2/STEP02) and the subsequent processes are repeated. On the other hand, if the total indication value is determined to exceed the reference value (FIG. 2/STEP12 . . . NO), a state detected by the state detection component 13 is determined (FIG. 2/STEP18). For example, the detected state is determined on the basis of various pieces of information acquired by the task control system 10 from a server of a weather information center or disaster information center (not shown).

If the detected state is the "first state" (FIG. 2/STEP18 . . . A), the assignment component 14 preferentially assigns the first task to a plurality of servers S1 to Sn (FIG. 2/STEP20). As shown in FIG. 3B, for example, this causes the first and second tasks to be assigned to a plurality of servers S1 to Sn in such a manner that the arithmetic processing load required for executing the first task is maximally assigned to a plurality of servers S1 to Sn. An assigning aspect of the arithmetic processing resource may be controlled in such a manner that an assignment ratio of the arithmetic processing resource with respect to the arithmetic processing load required for executing the first task is higher than an assignment ratio of the arithmetic processing resource with respect to the arithmetic processing load required for executing the second task.

The "first state" includes a current time being included in a specified time zone (e.g., long vacation, tourist season, commuting time zone on weekdays) having high probability of a traffic jam occurring in an area where the first client Ci1 as a transmitter of the request is present, a weather condition having a high probability of a traffic jam occurring in the relevant area (e.g., rainfall, snowfall, or low ambient temperature), an event being held with high probability of a traffic jam occurring in the relevant area (e.g., fireworks display, entertainment event at a commercial facility), and the like.

If the detected state is the "second state" (FIG. 2/STEP18 . . . B), the assignment component 14 preferentially assigns the second task to a plurality of servers S1 to Sn (FIG. 2/STEP22). As shown in FIG. 3C, for example, this causes the first and second tasks to be assigned to a plurality of servers S1 to Sn in such a manner that the arithmetic processing load required for executing the second task is maximally assigned to a plurality of servers S1 to Sn. An assigning aspect of the arithmetic processing resource may be controlled in such a manner that an assignment ratio of the arithmetic processing resource with respect to the arithmetic processing load required for executing the second task is higher than an assignment ratio of the arithmetic processing resource with respect to the arithmetic processing load required for executing the first task.

The "second state" includes a state having a higher effect degree on the user (entity) of each client Ci as compared to the first state, for example, a disaster (e.g., a natural disaster such as earthquake, tsunami, landslide, and mudflow, and a human-caused disaster). The second state can be also a state that is appropriate for the user of each client Ci to avoid such state as much as possible.

A table, in which various states each being assigned in advance with a score indicating the effect degree, may be stored in a storage device such that the score depending on the detected state according to the table is evaluated as the effect degree. The effect degree may be evaluated by the score being weighted depending on a distance between a spot or area where the relevant state occurs and each client Ci, and then accumulated. The state may be determined depending on whether or not a result of the evaluation is equal to or more than a certain value.

If the detected state does not correspond to any of the first and second states, the first and second tasks may be assigned to a plurality of servers S1 to Sn in such a manner that the arithmetic processing load required for executing each of the first and second tasks is assigned in a range below the maximum to a plurality of servers S1 to Sn, for example, as shown in FIG. 3D.

(Effect)

According to the task control system 10 exerting the function described above, if the arithmetic processing load required for executing the first and second tasks exceeds the acceptable value (see FIG. 2/STEP12 . . . NO, and FIG. 3A), the assigning aspects for the first and second tasks are differentiated with respect to the plurality of servers S1 to Sn (arithmetic processing resources) depending on the kind of the state (accurately, the state occurring at the area where the client Ci communicating with the servers S1 to Sn assigned with each task is present). Therefore, in consideration of the state or event in the area concerning increase in the arithmetic processing load required for executing each of a plurality of tasks, each task can be appropriately assigned to a plurality of arithmetic processing resources (servers).

Specifically, if the first state is detected, the first task is preferentially assigned to a plurality of servers S1 to Sn (see FIG. 2/STEP18 . . . A ->STEP20, FIG. 3B). If the first state is detected, accelerating the derivation of the first information and the transmission to the first client Ci1 has higher probability of being appropriate than improving accuracy of the second information (the second-class road traffic information). With taking this into consideration, even if the accuracy of the second information slightly decreases, each task may be assigned to the servers S1 to Sn in an aspect which is appropriate to meet the needs of the user of the first client Ci1 to promptly acquire the first information.

FIG. 4 shows a time-series change aspect of the arithmetic processing load required for executing the first task by an irregular wavelike solid line, and a time-series change aspect of the number of the servers assigned with the first task in the case where the "first state" is detected by a stepwise dash-single-dot line. FIG. 4 shows a time-series change aspect of the arithmetic processing load required for executing the second task by an irregular wavelike broken line, and a time-series change aspect of the number of the servers assigned with the second task in the case where the "first state" is detected by a stepwise dash-double-dot line.

As shown in FIG. 4, in a state where the number of the servers assigned with the first task is "4", and the number of the servers assigned with the second task is "6", the arithmetic processing load required for executing each of the first task and the second task gradually increases. Such a state occurs, for example, in a case where a traffic of vehicles is generally high, and a demand for execution of the first task and the second task increases.

If the "first state" is detected, the first task is more preferentially assigned to a plurality of servers than the second task. For this reason, the number of the servers assigned with the first task is increased from "4" to "6" at a time $t_{11}$, and after that, the number of the servers assigned with the second task is increased from "6" to "8" at a time $t_{12}$. Further, the number of the servers assigned with the first task is increased from "6" to "8" at a time $t_{13}$, and after that, the number of the servers assigned with the second task is increased from "8" to "10" at a time $t_{14}$. Then, the number of the servers assigned with the first task is increased from "8" to "10" at a time $t_{15}$, and after that, the number of the servers assigned with the second task is increased from "10" to "12" at a time $t_{16}$.

If the second state is detected, the second task is preferentially assigned to a plurality of servers S1 to Sn (see FIG. 2/STEP18 . . . B ->STEP22, FIG. 3C). If the second state is detected, improving accuracy of the second information (the second-class road traffic information) has higher probability of being appropriate than accelerating the derivation of the first information and the transmission to the first client Ci1. With taking this into consideration, even if the acquisition of the first information slightly delays, each task may be assigned to the servers S1 to Sn in an aspect which is appropriate to meet the needs of the user of each client Ci to improve the accuracy of the second information.

Figure 5:
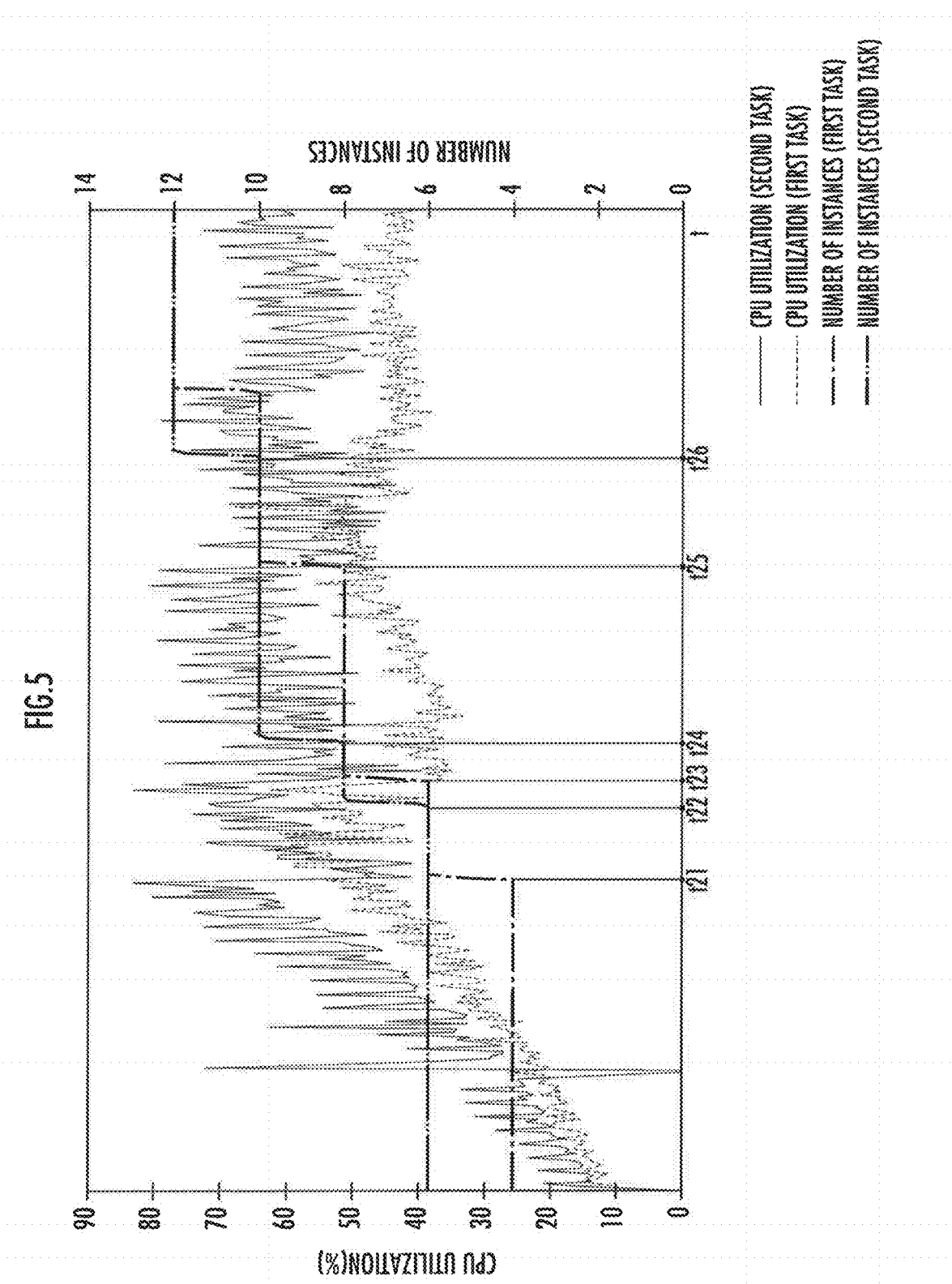
FIG. 5 is an explanatory diagram regarding a task assigning aspect in a case where the second state is detected.

FIG. 5 shows a time-series change aspect of the arithmetic processing load required for executing the second task by an irregular wavelike solid line, and a time-series change aspect of the number of the servers assigned with the second task in the case where the "second state" is detected by a stepwise dash-single-dot line. FIG. 5 shows a time-series change aspect of the arithmetic processing load required for executing the first task by an irregular wavelike broken line, and a time-series change aspect of the number of the servers assigned with the first task in the case where the "second state" is detected by a stepwise dash-double-dot line.

As shown in FIG. 5, in a state where the number of the servers assigned with the first task is "6", and the number of the servers assigned with the second task is "4", the arithmetic processing load required for executing each of the first task and the second task gradually increases.

If the "second state" is detected, the second task is more preferentially assigned to a plurality of servers than the first task. For this reason, the number of the servers assigned with the second task is increased from "4" to "6" at a time $t_{21}$, and after that, the number of the servers assigned with first task is increased from "6" to "8" at a time $t_{22}$. Further, the number of the servers assigned with the second task is increased from "6" to "8" at a time $t_{23}$, and after that, the number of the servers assigned with the first task is increased from "8" to "10" at a time $t_{24}$. Then, the number of the servers assigned with the second task is increased from "8" to "10" at a time $t_{25}$, and after that, the number of the servers assigned with the first task is increased from "10" to "12" at a time $t_{26}$.

(Other Embodiments of the Invention)

Two kinds of tasks are described in the above embodiment, but three or more kinds of tasks may be used in another embodiment. According to this, the state detection component 13 may recognize three or more detected states in distinction from each other.

In the above embodiment, the first state and the second state are distinguished depending on the level (high-low) of the effect degree on the user (entity) of each client Ci, but in another embodiment, a plurality of states may be distinguished in a different viewpoint such as a matching degree with respect to a preference of the user (entity) of each client Ci.

A unit for assigning the arithmetic processing resource may not be the server but a plurality of processors (CPU) constituting each server. In this case, one processor constituting the server is assigned with one task, and another processor constituting the same server is assigned with another task.

Figure 6:
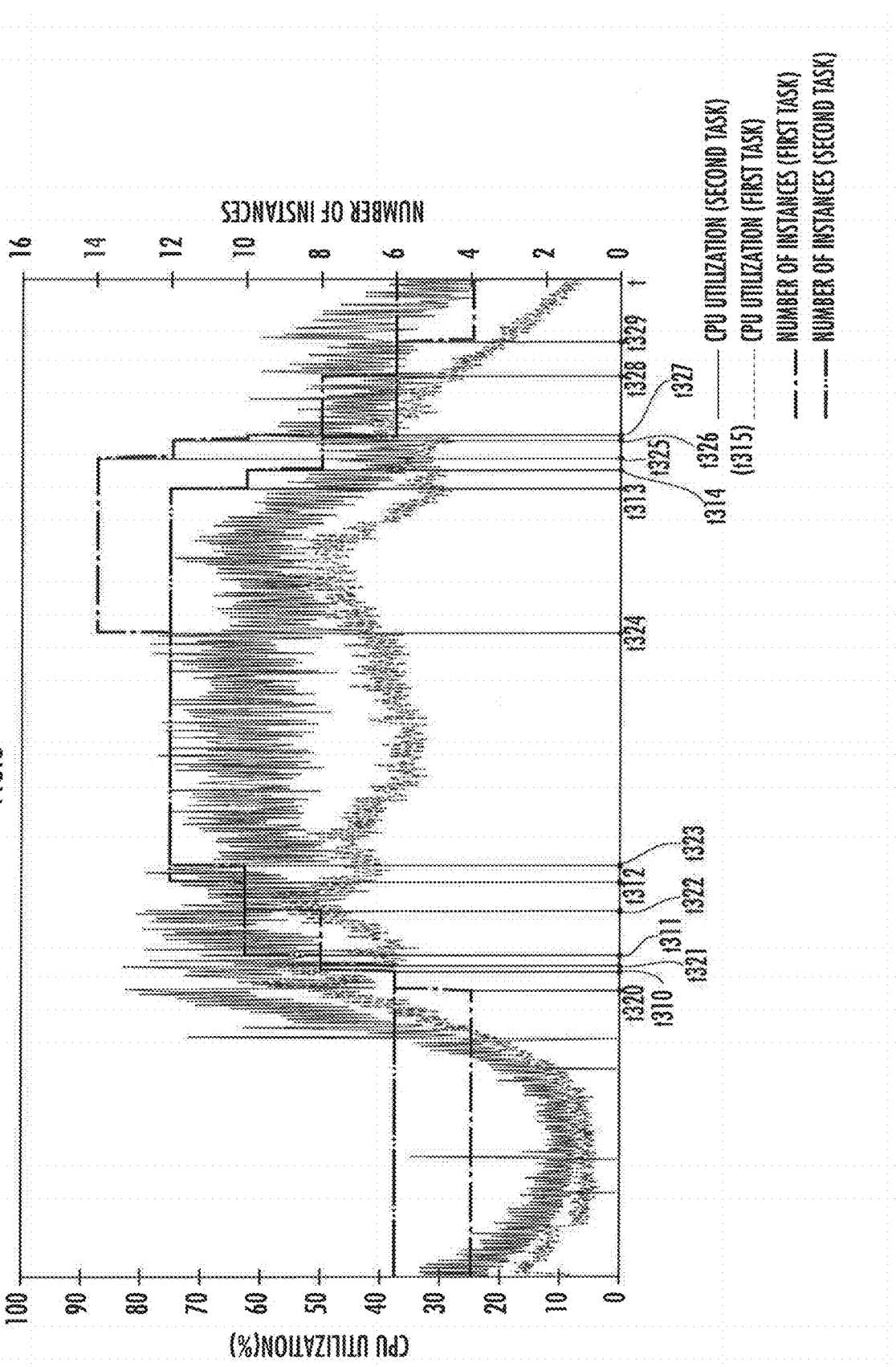
FIG. 6 is an explanatory diagram regarding another task assigning aspect.

If the "first state" is detected, the second task may be more preferentially assigned to a plurality of servers than the first task. If the "second state" is detected, the first task may be more preferentially assigned to a plurality of servers than the second task. FIG. 6 shows a change aspect of the number of servers assigned with each of the first and second tasks in the same form as in FIG. 5.

In the example in FIG. 6, if the "second state" is detected after the number of the servers assigned with the second task is increased from "4" to "6" at a time $t_{320}$, the first task is more preferentially assigned to a plurality of servers than the second task. For this reason, the number of the servers assigned with the first task is increased from "6" to "8" at a time $t_{310}$, and the number of the servers assigned with the second task is increased from "6" to "8" at a time $t_{321}$. Further, the number of the servers assigned with the first task is increased from "8" to "10" at a time $t_{311}$, and the number of the servers assigned with the second task is increased from "8" to "10" at a time $t_{322}$. Then, the number of the servers assigned with the first task is increased from "10" to "12" at a time $t_{312}$, the number of the servers assigned with the second task is increased from "10" to "12" at a time $t_{323}$, and further, after that, the number of the servers assigned with the second task is increased from "12" to "14" at a time $t_{324}$.

After that, the arithmetic processing load required for executing each of the first and the second tasks (see an irregular wavelike solid line and a broken line) decreases. Along with this, the number of the servers assigned with the first task is gradually decreased from "12" to "10" and from "10" to "8" at a time $t_{313}$ and a time $t_{314}$, respectively. At this stage, the second state may become undetected. Furthermore, the number of the servers assigned with the second task is gradually decreased from "14" to "12" and from "12" to "10" at a time $t_{325}$ and a time $t_{326}$, respectively. The number of the servers assigned with the first task is decreased from "8" to "6" at a time $t_{315}$, and the number of the servers assigned with the second task is decreased from "10" to "8" at a time $t_{327}$. Then, the number of the servers assigned with the second task is gradually decreased from "8" to "6" and from "6" to "4" at a time $t_{328}$ and a time $t_{329}$, respectively.

According to the task control system 10 of the above configuration, the preferential execution of the first task allows to accelerate providing the road traffic information and the like to each of a plurality of users depending on its demand. Therefore, for example, it is meaningful in the case where the second state is a disaster occurrence state.

REFERENCE SIGNS LIST

10 . . . Task control system, 11 . . . Load detection component, 12 . . . Determination component, 13 . . . State detection component, 14 . . . Assignment component, S1 to Sn . . . Server (arithmetic processing resource), C1 to Cm . . . Client

What is claimed is:

1. A task control system which assigns a plurality of tasks to each of a plurality of arithmetic processing resources constituting a distributed processing system, the resources being connected to be communicable with each other via a communication network, the task control system comprising:
a load detection component configured to detect an indication value which represents a degree of an arithmetic processing load required for executing each of the plurality of tasks;
a determination component configured to determine whether or not the indication value detected by the load detection component satisfies a predetermined condition;
a state detection component configured to detect states or occurring events concerning simultaneous execution of the plurality of tasks; and
an assignment component configured to assign each of the plurality of tasks to each of the plurality of arithmetic processing resources in a different order of priority depending on a difference in the states detected by the state detection component on a requirement that the determination component determines that the indication value satisfies the predetermined condition,
wherein the state detection component detects, in distinction from each other, plural states different in a level of an effect degree on an entity present in an area,
wherein the plural states include a first state in which the effect degree on the entity is relatively low and a second state in which the effect degree on the entity is relatively high,
wherein the first state is a state having high probability of traffic jam occurring,
wherein the second state is a state in which a disaster occurred,
wherein the first state is a state including at least one of a state in which a current time being included in a specified time zone having high probability of traffic jam occurring in the area where the entity is present, a state in which a weather condition having high probability of traffic jam occurring in the area, and a state in which an event being held with high probability of traffic jam occurring in the area, and
wherein the load detection component detects a first indication value representing a degree of an arithmetic processing load required for executing a first task as the specified task which includes deriving first information concerning the area depending on a request received from the entity or a first client thereof, and detects a second indication value representing a degree of an arithmetic processing load required for executing a second task as another task which includes deriving second information concerning the area based on basic information received from a second client.

2. The task control system according to claim 1, wherein on a requirement that the determination component determines that the indication value concerning one task of the plurality of tasks satisfies the predetermined condition of exceeding a first threshold, the assignment component increases the arithmetic processing resources to be assigned with the one task.

3. The task control system according to claim 2, wherein on a requirement that the determination component determines that the indication value concerning the one task satisfies the predetermined condition of being less than a second threshold after exceeding the first threshold, the assignment component decreases the arithmetic processing resources to be assigned with the one task.

4. The task control system according to claim 1, wherein the load detection component detects, as the indication value, CPU utilization or a time integral value of the CPU utilization, or a value of an increasing function of the CPU utilization or the time integral value.

5. The task control system according to claim 1, wherein the assignment component increases or decreases the arithmetic processing resources to be assigned with at least one or each of the plurality of tasks.

6. The task control system of claim 1, wherein the plurality of tasks includes:
a first task including to derive first information related to an entity present in an area or the area according to a request received from a first client, and
a second task including to derive second information related to a region based on basic information received from a second client.

7. The task control system according to claim 6, wherein the first task is a task which includes receiving a request including a departure place and a destination place from the first client, deriving as the first information, information indicating at least a part of a route configured of a plurality of links connecting the departure place and the destination place, and transmitting the first information to the first client, and
the second task is a task which includes receiving probe information from the second client, derives road traffic information used for deriving the route from the probe information, and transmitting the road traffic information to a server assigned with the first task or each client.

8. The task control system according to claim 6, wherein the first information includes information indicating at least a part of a server route constituted by a plurality of links connecting a departure place and a destination place of the first client,
the basic information includes position information representing latitude and longitude, or latitude, longitude, and altitude which indicates a position of the second client, and also time information indicating an existing time at the position, and
the second information includes second-class road traffic information at each link including moving cost.

9. The task control system according to claim 1, wherein the state detection component detects, in distinction from each other, plural states different in a level of an effect degree on an entity present in an area.

10. The task control system according to claim 9, wherein the plural states include a first state in which the effect degree on the entity is relatively low and a second state in which the effect degree on the entity is relatively high.

11. The task control system according to claim 10, wherein
the first state is a state having high probability of traffic jam occurring, and
the second state is a state in which a disaster occurred.

12. The task control system according to claim 10, wherein
the assignment component assigns a specified task more preferentially than another task to a plurality of the arithmetic processing loads, in a case where the state detection component detects the second state.

13. The task control system according to claim 11, wherein
the first state is a state including at least one of a state in which a current time being included in a specified time zone having high probability of traffic jam occurring in the area where the entity is present, a state in which a weather condition having
high probability of traffic jam occurring in the area, and a state in which an event being held with high probability of traffic jam occurring in the area.

* * * * *